US012680596B1

(12) United States Patent
Rozputyński et al.

(10) Patent No.: US 12,680,596 B1
(45) Date of Patent: Jul. 14, 2026

(54) PLANETARY GEAR ARRANGEMENT

(71) Applicant: Pratt & Whitney Canada Corp.,
Longueuil (CA)

(72) Inventors: Tomasz Rozputyński, Hyżne (PL);
Mateusz Kęsek, Nagawczyna (PL);
Sławomir Karbowiak, Zduńska Wola
(PL)

(73) Assignee: PRATT & WHITNEY CANADA
CORP., Longueuil (CA)

( * ) Notice: Subject to any disclaimer, the term of this
patent is extended or adjusted under 35
U.S.C. 154(b) by 0 days.

(21) Appl. No.: 19/278,117

(22) Filed: Jul. 23, 2025

(51) Int. Cl.
F16H 1/28 (2006.01)
F02C 7/36 (2006.01)
F16H 57/00 (2012.01)

(52) U.S. Cl.
CPC ................. F16H 1/28 (2013.01); F02C 7/36
(2013.01); F16H 57/0025 (2013.01); *F05D*
*2260/40311* (2013.01)

(58) Field of Classification Search
CPC .......... F16H 1/28; F16H 57/0025; F02C 7/36;
F05D 2260/40311
See application file for complete search history.

(56) References Cited

U.S. PATENT DOCUMENTS

| | | | | |
|---|---|---|---|---|
| 10,094,335 | B2 * | 10/2018 | Ertas | .......................... F02C 3/10 |
| 10,107,378 | B2 * | 10/2018 | Miller | ....................... F02K 3/06 |
| 12,049,943 | B1 * | 7/2024 | Ott | ......................... F16H 1/2845 |
| 2019/0292942 | A1 * | 9/2019 | Kallianteris | ............ F16D 1/101 |

* cited by examiner

*Primary Examiner* — Eldon T Brockman
(74) *Attorney, Agent, or Firm* — CANTOR COLBURN
LLP

(57) ABSTRACT

A planetary gear arrangement includes a sun gear rotatable
about a planetary gear central axis, a ring gear arranged
around the sun gear, and a plurality of planet gears posi-
tioned between the sun gear and the ring gear and engaged
with the sun gear and the ring gear. The plurality of planet
gears are supported by a planet carrier. An input shaft is
operably connected to the sun gear via a sun gear spline, and
a sun gear body positioned radially between the sun gear
spline and the plurality of planet gears includes one or more
axially-extending sun gear slots from a first axial end of the
sun gear body toward a second axial end of the sun gear
body.

20 Claims, 3 Drawing Sheets

32

PLANETARY GEAR ARRANGEMENT

BACKGROUND

Exemplary embodiments pertain to the art of aircraft systems, and in particular to a planetary gear arrangement of a gearbox of an aircraft engine system.

Such planetary gear arrangements are utilized to reduce a rotational speed between the turbomachinery and a fan/propeller/output shaft of the system, depending on the engine type. In a planetary gearbox system, journal-type bearings are utilized in planet gears to achieve mass reduction, enhance reliability at high speeds, and simplify the overall design.

In a planetary arrangement, especially in a two-stage gearbox, due to axial space limitations, a spline connection of a sun gear to the input shaft, can have sub-optimal axial position. If the sun gear spine is close to the torque output side of the sun gear, it may result in loading and bending stress concentration on one axial a sun gear to planet gear interface,

BRIEF DESCRIPTION

In one embodiment, a planetary gear arrangement includes a sun gear rotatable about a planetary gear central axis, a ring gear arranged around the sun gear, and a plurality of planet gears positioned between the sun gear and the ring gear and engaged with the sun gear and the ring gear. The plurality of planet gears are supported by a planet carrier. An input shaft is operably connected to the sun gear via a sun gear spline, and a sun gear body positioned radially between the sun gear spline and the plurality of planet gears includes one or more axially-extending sun gear slots from a first axial end of the sun gear body toward a second axial end of the sun gear body.

Additionally or alternatively, in this or other embodiments the sun gear spline is disposed at the first axial end of the sun gear body.

Additionally or alternatively, in this or other embodiments the one or more axially-extending sun gear slots define a radially-extending sun gear wall at the second axial end.

Additionally or alternatively, in this or other embodiments the input shaft is installed into a sun gear opening at the second axial end.

Additionally or alternatively, in this or other embodiments the sun gear and the plurality of planet gears define a sun gear mesh therebetween, radially outboard of the sun gear spline.

Additionally or alternatively, in this or other embodiments the axially-extending sun gear slots extend greater than 50% of an axial length of the sun gear body.

Additionally or alternatively, in this or other embodiments the axially-extending sun gear slots extend in the range of 25% to 90% of an axial length of the sun gear body.

Additionally or alternatively, in this or other embodiments the planet carrier is operably connected to an output shaft via a carrier spline.

Additionally or alternatively, in this or other embodiments each planet gear is secured to the planet carrier via a pin shaft.

Additionally or alternatively, in this or other embodiments a bushing is positioned radially between the planet gear and the pin shaft.

In another embodiment, a gas turbine engine system includes a gas turbine engine, and a gearbox operably connected to the gas turbine engine. The gearbox is configured to extract energy from the gas turbine engine and includes an output shaft rotatable about a shaft axis. The output shaft is configured to connect to one or more auxiliary components. A planetary gear arrangement is operably connected to the output shaft. The planetary gear arrangement includes a sun gear rotatable about a planetary gear central axis, a ring gear arranged around the sun gear, and a plurality of planet gears positioned between the sun gear and the ring gear and engaged with the sun gear and the ring gear. The plurality of planet gears are supported by a planet carrier. An input shaft operably is connected to the sun gear via a sun gear spline, and a sun gear body positioned radially between the sun gear spline and the plurality of planet gears includes one or more axially-extending sun gear slots from a first axial end of the sun gear body toward a second axial end of the sun gear body.

Additionally or alternatively, in this or other embodiments the sun gear spline is positioned at the first axial end of the sun gear body.

Additionally or alternatively, in this or other embodiments the one or more axially-extending sun gear slots define a radially-extending sun gear wall at the second axial end.

Additionally or alternatively, in this or other embodiments the input shaft is installed into a sun gear opening at the second axial end.

Additionally or alternatively, in this or other embodiments the sun gear and the plurality of planet gears define a sun gear mesh therebetween, radially outboard of the sun gear spline.

Additionally or alternatively, in this or other embodiments the axially-extending sun gear slots extend greater than 50% of an axial length of the sun gear body.

Additionally or alternatively, in this or other embodiments the axially-extending sun gear slots extend in the range of 25% to 90% of an axial length of the sun gear body.

Additionally or alternatively, in this or other embodiments the planet carrier is operably connected to the output shaft via a carrier spline.

Additionally or alternatively, in this or other embodiments each planet gear is secured to the planet carrier via a pin shaft.

Additionally or alternatively, in this or other embodiments a bushing is positioned radially between the planet gear and the pin shaft.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
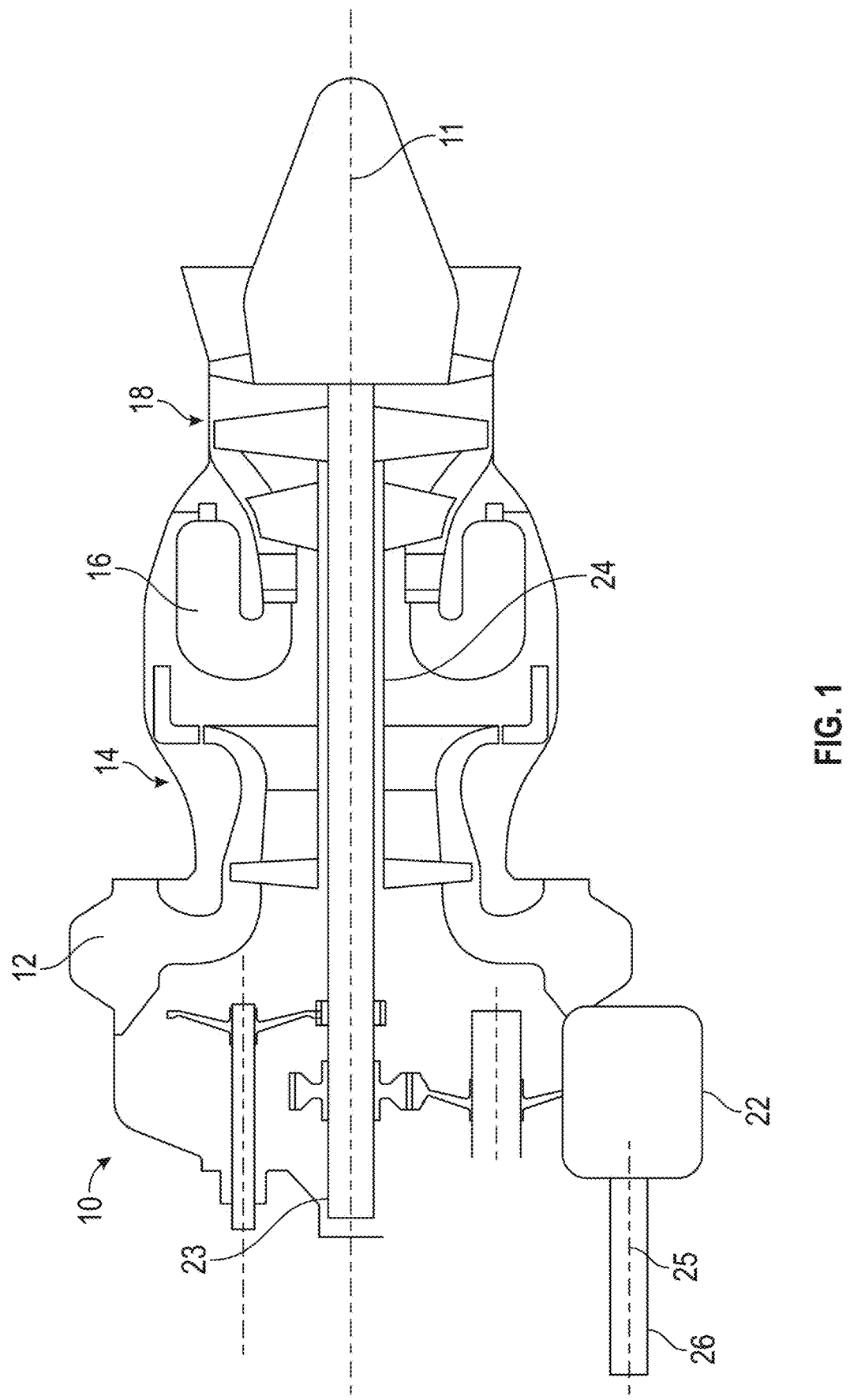
FIG. 1 is a schematic cross-sectional view of an embodiment of a gas turbine engine.

FIG. 1 illustrates a gas turbine engine 10 of a type preferably provided for use in subsonic flight, generally comprising in serial flow communication an inlet 12 through which ambient air enters the gas turbine engine 10, a compressor section 14 for pressurizing the air, a combustor 16 in which the compressed air is mixed with fuel and ignited for generating an annular stream of hot combustion gases, and a turbine section 18 for extracting energy from the combustion gases. The compressor section 14, and the turbine section 18 are rotatable about a central axis 11 of the engine 10.

A low pressure shaft 23 is drivingly connected to low pressure rotor(s) of the turbine section 18, and the high pressure rotor(s) of the compressor section 14 is/are drivingly connected to high pressure rotor(s) of the turbine section 18 through a high pressure shaft 24 concentrically surrounding the low pressure shaft 23.

The gas turbine engine 10 includes a gear box 22 operably connected to an output shaft 26, which in some embodiments rotates about a shaft axis 25 offset from the central axis 11. The output through shaft 26 is, in some embodiments operably connected to, for example, a main rotor gearbox at a first end of the output through shaft 26 and a tail rotor gearbox at a second end of the output through shaft 26. In the illustrated embodiment, the output through shaft 26 is operably connected to and driven by the low pressure shaft 23, but one skilled in the art will appreciate that in other embodiments, the output through shaft 26 may be connected to an driven by the high pressure shaft 24. The output shaft 26 may be operably connected to, for example, a fan, a propeller or a rotor to drive rotation thereof.

Figure 2:
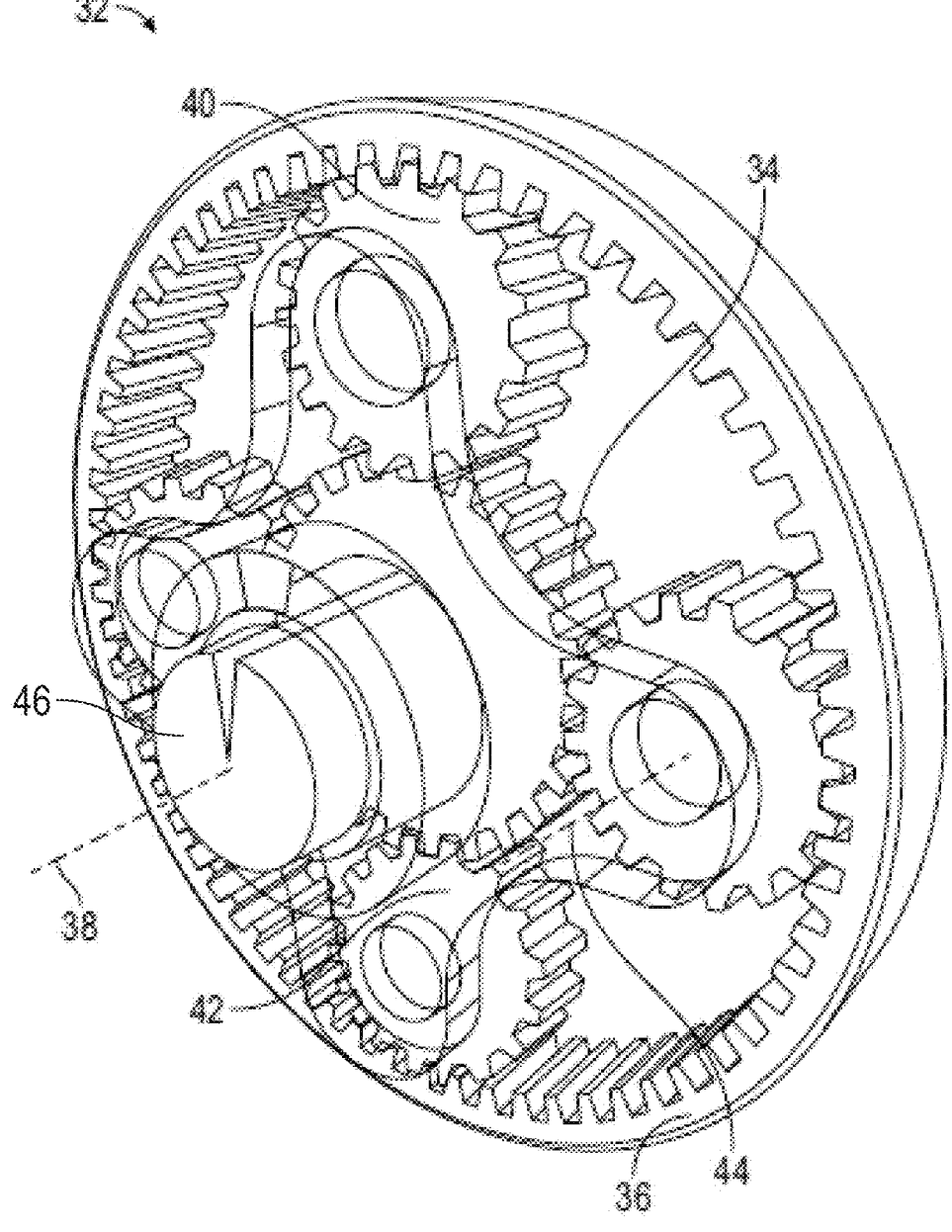
FIG. 2 is a schematic illustration of an exemplary planetary gear arrangement of an accessory gearbox of a gas turbine engine.

Referring now to FIG. 2, the gearbox 22 includes a planetary gear arrangement 32 to transfer rotational energy from, for example, the low pressure shaft 23 to the output shaft 26. The planetary gear arrangement 32 includes a sun gear 34 and a ring gear 36 surrounding the sun gear 34, with a plurality of planet gears 40 are positioned between the sun gear 34 and the ring gear 36 and are meshed with the sun gear 34 and the ring gear 36. The planet gears 40 are each rotatably mounted on a planet carrier 42, with each of the planet gears 40 configured to rotate about their respective planet gear axes 44. In one embodiment, the ring gear 36 is rotationally fixed, while the sun gear 34 and the planet carrier 42 with the planet gears 40 are configured to rotate about the planetary gear central axis 38. Torque is input into the planetary gear arrangement 32 via an input shaft 46 operably connected to the sun gear 34.

Figure 3:
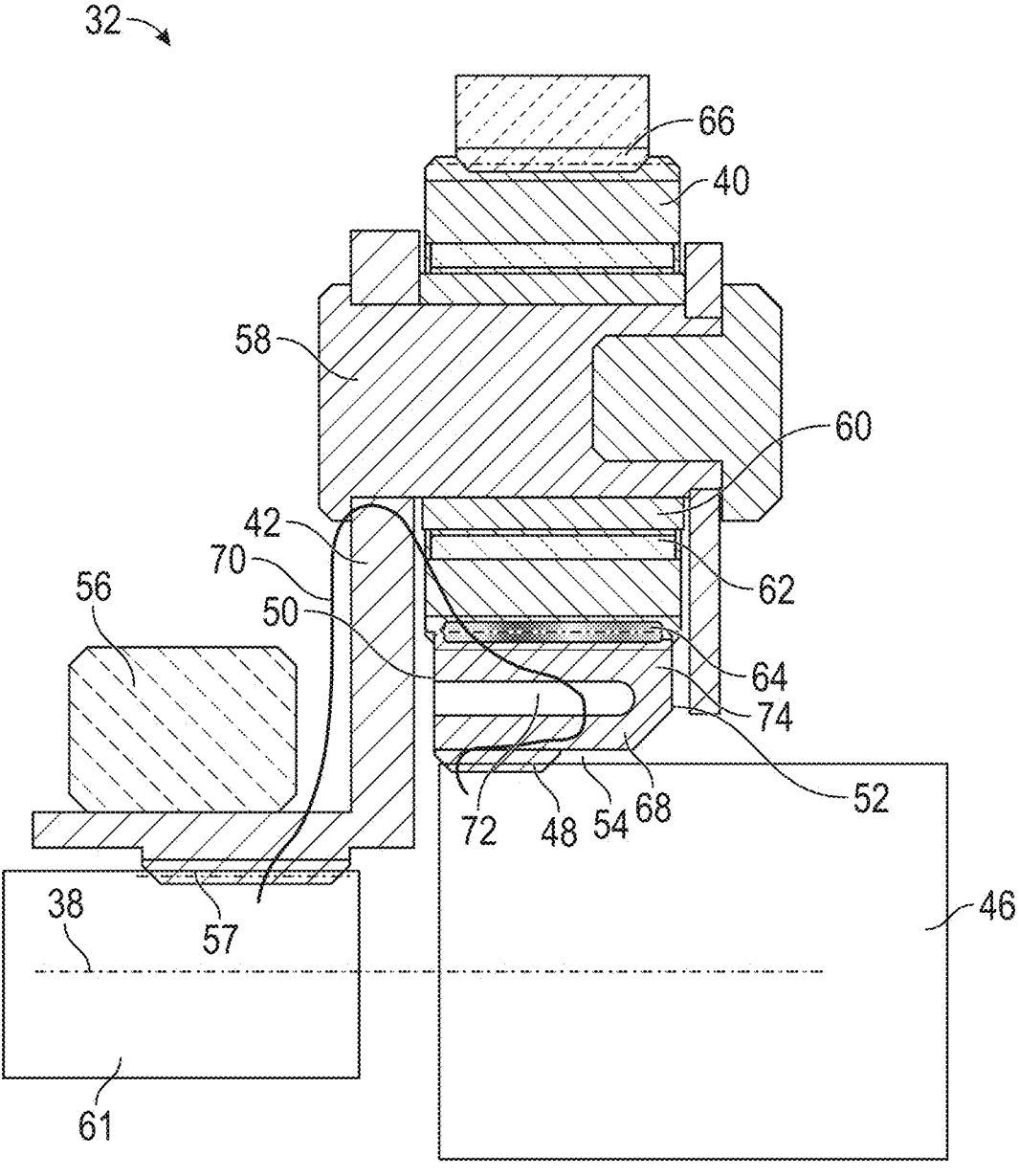
FIG. 3 is a cross-sectional view of an embodiment of a planetary gear arrangement.

Referring now to FIG. 3, illustrated is an exemplary cross-sectional view the planetary gear arrangement 32. The planet carrier 42 is supported by a carrier bearing 56, and includes a carrier spline 57 to operably connect the planet carrier 42 to an output shaft 61. Each of the planet gears 40 are mounted to the planet carrier 42 by a pin shaft 58, and are further supported by a bushing 60 and sleeve 62 arrangement positioned between the pin shaft 58 and the planet gear 40. The sun gear 34 interfaces with each of the planet gears 40 via a sun gear mesh 64, while the ring gear 36 similarly interfaces with each of the planet gears 40 at a ring gear mesh 66.

The sun gear 34 is operably connected to the input shaft 46 via a sun gear spline 48. In some configurations, the sun gear spline 48 is located at a first axial end 50 of the sun gear 34, which is opposite a second axial end 52 of the sun gear 34, in which the input shaft 46 is installed therein via a sun gear opening 54. The sun gear 34 includes a sun gear body 68 defined radially between the sun gear spline 48 and the sun gear mesh 64. To modify a torque path 70 through the sun gear 34 and into the sun gear mesh 64, the sun gear body 68 includes one or more axially-extending sun gear slots 72 extending at least partially through the sun gear body 68. In some embodiments, the sun gear slots 72 extend into the sun gear body 68 from the first axial end 50 toward the second axial end 52. The formation of the sun gear slots 72 leaves a radially-extending sun gear wall 74 defined at the second axial end 52 of the sun gear 34. In some embodiments, the sun gear slots 72 extend greater than 50% of an axial length of the sun gear body 68. In other embodiments, the sun gear slots 72 extend between 25% and 90% of the axial length of the sun gear body 68.

The sun gear slots 72 modify the torque path 70 relative to a sun gear not including such sun gear slots 72, shifting the torque path 70 at the sun gear mesh 64 from near the first axial end 50 of the sun gear 34 toward a location near axially midway between the first axial end 50 and the second axial end 52. The torque path 70 continues into the planet carrier 42 and to the output shaft 61 via the carrier spline 57.

This modified torque path 70 reduces stress concentrations of the sun gear mesh 64 at the first axial end 50.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A planetary gear arrangement, comprising:
a sun gear rotatable about a planetary gear central axis;
a ring gear arranged around the sun gear; and
a plurality of planet gears disposed between the sun gear and the ring gear and engaged with the sun gear and the ring gear, the plurality of planet gears supported by a planet carrier; and
an input shaft operably connected to the sun gear via a sun gear spline;
wherein a sun gear body disposed radially between the sun gear spline and the plurality of planet gears includes one or more axially-extending sun gear slots from a first axial end of the sun gear body toward a second axial end of the sun gear body;
wherein each axially-extending sun gear slot of the one or more axially-extending sun gear slots defines a locally reduced axial material thickness of the sun gear body.

2. The planetary gear arrangement of claim 1, wherein the sun gear spline is disposed at the first axial end of the sun gear body.

3. The planetary gear arrangement of claim 1, wherein the one or more axially-extending sun gear slots define a radially-extending sun gear wall at the second axial end.

4. The planetary gear arrangement of claim 1, wherein the input shaft is installed into a sun gear opening at the second axial end.

5. The planetary gear arrangement of claim 1, wherein the sun gear and the plurality of planet gears define a sun gear mesh therebetween, radially outboard of the sun gear spline.

6. The planetary gear arrangement of claim 1, wherein the axially-extending sun gear slots extend greater than 50% of an axial length of the sun gear body.

7. The planetary gear arrangement of claim 1, wherein the axially-extending sun gear slots extend in the range of 25% to 90% of an axial length of the sun gear body.

8. The planetary gear arrangement of claim 1, wherein the planet carrier is operably connected to an output shaft via a carrier spline.

9. The planetary gear arrangement of claim 1, wherein each planet gear is secured to the planet carrier via a pin shaft.

10. The planetary gear arrangement of claim 9, further comprising a bushing disposed radially between the planet gear and the pin shaft.

11. A gas turbine engine system, comprising:
a gas turbine engine; and
a gearbox operably connected to the gas turbine engine, the gearbox configured to extract energy from the gas turbine engine, the gearbox including:
    an output shaft rotatable about a shaft axis, the output shaft configured to connect to one or more auxiliary components; and
    a planetary gear arrangement operably connected to the output shaft, the planetary gear arrangement including:
        a sun gear rotatable about a planetary gear central axis;
        a ring gear arranged around the sun gear; and
        a plurality of planet gears disposed between the sun gear and the ring gear and engaged with the sun gear and the ring gear, the plurality of planet gears supported by a planet carrier;
an input shaft operably connected to the sun gear via a sun gear spline; and
wherein a sun gear body disposed radially between the sun gear spline and the plurality of planet gears includes one or more axially-extending sun gear slots from a first axial end of the sun gear body toward a second axial end of the sun gear body;
wherein each axially-extending sun gear slot of the one or more axially-extending sun gear slots defines a locally reduced axial material thickness of the sun gear body.

12. The gas turbine engine system of claim 11, wherein the sun gear spline is disposed at the first axial end of the sun gear body.

13. The gas turbine engine system of claim 11, wherein the one or more axially-extending sun gear slots define a radially-extending sun gear wall at the second axial end.

14. The gas turbine engine system of claim 11, wherein the input shaft is installed into a sun gear opening at the second axial end.

15. The gas turbine engine system of claim 11, wherein the sun gear and the plurality of planet gears define a sun gear mesh therebetween, radially outboard of the sun gear spline.

16. The gas turbine engine system of claim 11, wherein the axially-extending sun gear slots extend greater than 50% of an axial length of the sun gear body.

17. The gas turbine engine system of claim 11, wherein the axially-extending sun gear slots extend in the range of 25% to 90% of an axial length of the sun gear body.

18. The gas turbine engine system of claim 11, wherein the planet carrier is operably connected to the output shaft via a carrier spline.

19. The gas turbine engine system of claim 11, wherein each planet gear is secured to the planet carrier via a pin shaft.

20. The gas turbine engine system of claim 19, further comprising a bushing disposed radially between the planet gear and the pin shaft.

* * * * *